United States Patent
Matsuoka (10) Patent No.: US 10,245,903 B2
(45) Date of Patent: Apr. 2, 2019

(54) COMMUNICATION DEVICE MOUNTING POSITION DETERMINATION SYSTEM AND DETERMINATION APPARATUS

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Kenji Matsuoka, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka (JP)

( * ) Notice: Subject to any disclaimer, the term of this patent is extended or adjusted under 35 U.S.C. 154(b) by 17 days.

(21) Appl. No.: 15/559,494

(22) PCT Filed: Mar. 17, 2016

(86) PCT No.: PCT/JP2016/058480
§ 371 (c)(1),
(2) Date: Sep. 19, 2017

(87) PCT Pub. No.: WO2016/158446
PCT Pub. Date: Oct. 6, 2016

(65) Prior Publication Data
US 2018/0111429 A1   Apr. 26, 2018

(30) Foreign Application Priority Data

Mar. 27, 2015   (JP) .................................. 2015-066857

(51) Int. Cl.
*B60C 23/04* (2006.01)
*H04B 17/318* (2015.01)
(Continued)

(52) U.S. Cl.
CPC ........ *B60C 23/0416* (2013.01); *B60C 23/045* (2013.01); *B60C 23/0437* (2013.01);
(Continued)

(58) Field of Classification Search
CPC ............ B60C 23/0416; B60C 23/0437; B60C 23/045; H04B 17/318; H04B 5/00; H04M 1/7253; G01S 5/0252; G01S 5/14
(Continued)

(56) References Cited

U.S. PATENT DOCUMENTS 5,629,873 A * 5/1997 Mittal .................. B60C 23/003
   152/415
5,838,229 A * 11/1998 Robinson, III ..... B60C 23/0401
   340/442
(Continued)

FOREIGN PATENT DOCUMENTS

JP  2009-214708 A  9/2009
JP  2012-224230 A  11/2012
(Continued)

OTHER PUBLICATIONS

Search Report for PCT/JP2016/058480, dated Jun. 14, 2016.

*Primary Examiner* — Hai V Nguyen
(74) *Attorney, Agent, or Firm* — Honigman LLP (57) ABSTRACT

A communication device mounting position determination system and apparatus are provided configured to limit where a device can be installed in a vehicle. An ECU transmits an LF signal from an LF antenna to sensor units. The sensor units receive and detect the signal strength. The sensor units transmit a UHF signal to the ECU having information including the signal strength of the LF signal. The ECU detects the signal strength of the UHF signals. For example, on the basis of the signal strength of the LF signal, the ECU makes a determination as to which of the wheels is the (Continued)

transmission source of the UHF signal, with respect to the left-right direction of the body of the vehicle. Further, on the basis of the signal strength of the UHF signal received by the ECU, the ECU makes the determination with respect to the front-rear direction of the vehicle.

11 Claims, 6 Drawing Sheets

(51) Int. Cl.
*G01S 5/02* (2010.01)
*G01S 5/14* (2006.01)

(52) U.S. Cl.
CPC .............. *G01S 5/0252* (2013.01); *G01S 5/14* (2013.01); *H04B 17/318* (2015.01)

(58) Field of Classification Search
USPC ........................................................ 455/41.2
See application file for complete search history.

(56) References Cited

U.S. PATENT DOCUMENTS

| | | | | |
|---|---|---|---|---|
| 6,622,553 B2* | 9/2003 | Hayashi | .............. | B60C 23/0408 73/146 |
| 6,794,993 B1* | 9/2004 | Kessler | .............. | B60C 23/0408 340/442 |
| 6,879,252 B2* | 4/2005 | DeZorzi | .............. | B60C 23/0416 340/10.1 |
| 6,888,446 B2* | 5/2005 | Nantz | ................. | B60C 23/0416 340/433 |
| 6,907,776 B2* | 6/2005 | Fischer | .............. | B60C 23/0408 340/440 |
| 6,980,099 B2* | 12/2005 | Kroitzsch | ........... | B60C 23/0416 340/447 |
| 7,250,851 B2* | 7/2007 | Lefaure | .............. | B60C 23/0416 340/426.18 |
| 7,825,787 B2* | 11/2010 | Saitou | ................... | B60C 23/045 340/442 |
| 8,031,065 B2* | 10/2011 | Tanaka | ................ | B60C 23/0416 340/442 |
| 8,654,818 B2* | 2/2014 | Kosugi | ................. | H04L 1/0061 370/300 |
| 8,798,853 B2* | 8/2014 | Kanenari | .............. | B60C 23/007 340/438 |
| 9,132,705 B2* | 9/2015 | Schultes | .............. | B60C 23/045 |
| 9,399,376 B2* | 7/2016 | Lickfelt | .............. | B60C 23/0418 |
| 9,446,636 B2* | 9/2016 | Deniau | .............. | B60C 23/0479 |
| 9,517,664 B2* | 12/2016 | McIntyre | ................ | B60C 23/02 |
| 9,522,578 B1* | 12/2016 | Singh | .................. | B60C 23/0416 |
| 9,621,535 B2* | 4/2017 | Kojima | .............. | G07C 9/00309 |
| 9,925,836 B2* | 3/2018 | Sogabe | ................ | B60C 23/044 |
| 9,950,579 B2* | 4/2018 | Sogabe | ................... | B60C 23/04 |
| 9,956,833 B2* | 5/2018 | Oomi | ..................... | B60C 23/02 |
| 10,008,060 B2* | 6/2018 | Inoue | .................... | B60R 25/209 |
| 10,059,305 B2* | 8/2018 | Imamura | ................ | G01S 19/14 |
| 10,093,137 B2* | 10/2018 | Peine | .............. | B60C 23/0416 |
| 2004/0095233 A1* | 5/2004 | DeZorzi | .............. | B60C 23/0416 340/446 |
| 2004/0164854 A1* | 8/2004 | Nantz | ................ | B60C 23/0416 340/443 |
| 2006/0290484 A1* | 12/2006 | Bauchot | .............. | B60C 23/0416 340/442 |
| 2007/0120644 A1* | 5/2007 | Seike | .................. | B60R 25/2072 340/5.61 |
| 2007/0229240 A1* | 10/2007 | Yasuda | .................... | B60C 23/04 340/442 |
| 2008/0258894 A1* | 10/2008 | Saitou | .................. | B60C 23/0416 340/447 |
| 2009/0002146 A1* | 1/2009 | Lin | ...................... | B60C 23/0416 340/447 |
| 2009/0085734 A1* | 4/2009 | Gila | ....................... | B60C 23/007 340/447 |
| 2009/0231115 A1* | 9/2009 | Tanaka | ................ | B60C 23/0416 340/447 |
| 2011/0304442 A1* | 12/2011 | Lickfelt | .............. | B60C 23/0418 340/10.33 |
| 2011/0304451 A1* | 12/2011 | Lickfelt | .............. | B60C 23/0418 340/442 |
| 2012/0136530 A1* | 5/2012 | Kanenari | ............. | B60C 23/007 701/33.4 |
| 2012/0203400 A1* | 8/2012 | Schultes | ............. | B60C 23/0416 701/1 |
| 2012/0236951 A1* | 9/2012 | Kosugi | .............. | H04L 1/0061 375/259 |
| 2013/0301829 A1* | 11/2013 | Kawamura | ........... | H04L 9/0816 380/44 |
| 2016/0005250 A1* | 1/2016 | Inoue | ................ | B60R 25/209 701/2 |
| 2016/0039365 A1* | 2/2016 | Vanderwall | ............. | B60R 25/24 701/36 |
| 2016/0050309 A1* | 2/2016 | Gooberman | ....... | H04M 1/72577 455/418 |
| 2016/0129736 A1* | 5/2016 | Peine | .................. | B60C 23/0416 701/32.3 |
| 2016/0149884 A1* | 5/2016 | Kojima | .............. | G07C 9/00309 340/5.61 |
| 2016/0207363 A1* | 7/2016 | Sogabe | ................. | B60C 23/044 |
| 2016/0214445 A1* | 7/2016 | Sogabe | .................... | B60C 23/04 |
| 2017/0055135 A1* | 2/2017 | Jimenez | .................. | H04W 4/10 |
| 2017/0174014 A1* | 6/2017 | Stewart | .............. | B60C 23/0447 |
| 2017/0190318 A1* | 7/2017 | Imamura | .................. | G01S 19/14 |
| 2017/0228502 A1* | 8/2017 | Rickard | .................. | G16H 10/60 |
| 2017/0326928 A1* | 11/2017 | Oomi | ..................... | B60C 23/02 |

FOREIGN PATENT DOCUMENTS

| | | |
|---|---|---|
| JP | 2013-123997 A | 6/2013 |
| JP | 2014-031089 A | 2/2014 |
| JP | 2014-125096 A | 7/2014 |

* cited by examiner

COMMUNICATION DEVICE MOUNTING POSITION DETERMINATION SYSTEM AND DETERMINATION APPARATUS

CROSS-REFERENCE TO RELATED APPLICATIONS

This application is the U.S. national stage of PCT/JP2016/058480 filed Mar. 17, 2016, which claims priority of Japanese Patent Application No. JP 2015-066857 filed Mar. 27, 2015.

TECHNICAL FIELD

The present invention relates to a communication device mounting position determination system and a determination apparatus that, in a state where communication devices are attached to each of a plurality of wheels (tires) mounted on a vehicle and each communication device transmits and receives wireless signals to and from a determination apparatus provided in the vehicle body, determine which wheel is equipped with the communication device from which the wireless signal has been received.

BACKGROUND

A TPMS (Tire Pressure Monitoring System), which monitors the air pressure in each of tires mounted on a vehicle, is known. In a conventional TPMS, a sensor unit that detects air pressure is attached to each tire, and detection results are transmitted wirelessly to a monitoring apparatus provided in the vehicle body. It is necessary for the monitoring apparatus to distinguish the tire to which the received detection results pertain.

JP 2012-224230A discloses a tire position determination system including tire valves provided in each of tires in a vehicle, and a wireless signal transmitter provided in a position that is a different distance from each of the tires. Each tire valve receives the wireless signal transmitted by the transmitter, and it is determined which tire valve the wireless signal is from on the basis of a reception strength of the wireless signal at each tire valve.

JP 2013-123997A discloses a wheel position determination apparatus in which an RF signal transmission circuit is provided in a tire sensor unit in each of tires, and an antenna of a receiver unit that receives the RF signals is disposed in a position a different distance from each of the transmission circuits. The apparatus determines the position of the tire sensor units on the basis of reception strengths of the RF signals from the tire sensor units at the receiver unit.

According to the tire position determination system disclosed in JP 2012-224230A, it is necessary for the wireless signal transmitter to be provided in a different position from each of the tires. There is thus a problem in that the position where the transmitter can be installed in the vehicle is limited. Likewise, according to the wheel position determination apparatus disclosed in JP 2013-123997A, it is necessary for the antenna of the receiver unit to be disposed in a position that is a different distance from each of the transmission circuits in the tire sensor units, and there is thus a problem in that the position where the antenna can be installed is limited. There is a risk that such limitations on the position where such vehicle-side communication devices, such as transmitters and receiver units, can be installed in a narrow space such as a vehicle will greatly interfere with the overall design of the vehicle. Also, because the signal strength of an RF signal undergoes little attenuation with respect to distance, it is not easy to accurately determine the positions of four wheels that are at only slightly different distances.

Having been achieved in light of such circumstances, it is an object of the present invention to provide a communication device mounting position determination system and a determination apparatus capable of relaxing limitations on where a vehicle-side communication apparatus can be installed in a vehicle, and capable of accurately determining the mounting position of a communication device.

SUMMARY

A communication device mounting position determination system according to the present invention is a communication device mounting position determination system including a communication device provided in each of wheels of a vehicle and a determination apparatus, provided in a vehicle body of the vehicle, including a determination unit that exchanges wireless signals with the communication devices and determines which of the vehicle wheels is provided with the communication device from which the wireless signal has been received. The determination apparatus includes a vehicle body-side transmission unit that transmits a first wireless signal in a first frequency band to the communication devices, a vehicle body-side receiving unit that receives a second wireless signal in a second frequency band transmitted by the communication devices, and a vehicle body-side signal strength detection unit that detects a signal strength of the second wireless signal received by the receiving unit. Each of the communication devices includes a wheel-side receiving unit that receives the first wireless signal transmitted by the determination apparatus, a wheel-side signal strength detection unit that detects a signal strength of the first wireless signal received by the receiving unit, and a wheel-side transmission unit that transmits, in the second wireless signal, information including the signal strength detected by the signal strength detection unit. The determination unit determines which wheel is provided with the communication device from which the vehicle body-side receiving unit has received the second wireless signal on the basis of the signal strength of the second wireless signal detected by the vehicle body-side signal strength detection unit and the signal strength included in the second wireless signal received by the vehicle body-side receiving unit.

Additionally, in a communication device mounting position determination system according to the present invention, the vehicle is provided with four of the wheels, the wheels being provided on the front- and rear-left and right of the vehicle body. The determination unit determines a direction in which the communication device that is the transmission source of the second wireless signal received by the vehicle body-side receiving unit is provided with respect to one of a front-rear direction of the vehicle body and a left-right direction of the vehicle body, on the basis of the signal strength of the first wireless signal included in the second wireless signal received by the vehicle body-side receiving unit; and determines a direction in which the communication device that is the transmission source of the second wireless signal received by the vehicle body-side receiving unit is provided with respect to the other of the front-rear direction of the vehicle body and the left-right direction of the vehicle body, on the basis of the signal strength of the second wireless signal detected by the vehicle body-side signal strength detection unit.

Additionally, in a communication device mounting position determination system according to the present invention, the determination unit: determines the direction in which the communication device that is the transmission source of the second wireless signal received by the vehicle body-side receiving unit is provided with respect to the left-right direction of the vehicle body, on the basis of the signal strength of the first wireless signal included in the second wireless signal received by the vehicle body-side receiving unit; and determines the direction in which the communication device that is the transmission source of the second wireless signal received by the vehicle body-side receiving unit is provided with respect to the front-rear direction of the vehicle body, on the basis of the signal strength of the second wireless signal detected by the vehicle body-side signal strength detection unit.

Additionally, in a communication device mounting position determination system according to the present invention, an antenna through which the vehicle body-side transmission unit transmits the first wireless signal is offset toward the left side or the right side of the vehicle; and an antenna through which the vehicle body-side receiving unit receives the second wireless signal is offset toward the front side or the rear side of the vehicle.

Additionally, in a communication device mounting position determination system according to the present invention, two antennae through which the vehicle body-side transmission unit transmits the first wireless signal are provided, the antennae being provided on the left side and the right side of the vehicle, respectively.

Additionally, in a communication device mounting position determination system according to the present invention, the first frequency band is an LF (Low Frequency) band, and the second frequency band is a UHF (Ultra High Frequency) band.

A determination apparatus according to the present invention is a determination apparatus, installed in a vehicle body of a vehicle, including a determination unit that exchanges wireless signals with a communication device provided in each of wheels of the vehicle and determines which of the vehicle wheels is provided with the communication device from which the wireless signal has been received. The apparatus includes a vehicle body-side transmission unit that transmits a first wireless signal in a first frequency band to the communication devices, a vehicle body-side receiving unit that receives a second wireless signal in a second frequency band transmitted by the communication devices, and a vehicle body-side signal strength detection unit that detects a signal strength of the second wireless signal received by the receiving unit. Each of the communication devices detects a signal strength of the received first wireless signal and transmits, in the second wireless signal, information including the detected signal strength. The determination unit determines which wheel is provided with the communication device from which the vehicle body-side receiving unit has received the second wireless signal on the basis of the signal strength of the second wireless signal detected by the vehicle body-side signal strength detection unit and the signal strength included in the second wireless signal received by the vehicle body-side receiving unit.

In the present invention, wireless signals are exchanged between the communication devices provided in each of the wheels of the vehicle and the determination apparatus provided in the vehicle body, and the determination apparatus determines which of the vehicle wheels is provided with the communication device from which the wireless signal has been received. The determination apparatus transmits the first wireless signal in the first frequency band to each of the communication devices. Each of the communication devices receives the first wireless signal from the determination apparatus and detects the signal strength of the received first wireless signal. Each of the communication devices transmits information including the detected signal strength to the determination apparatus in the second wireless signal in the second frequency band. The determination apparatus receives the second wireless signals from the communication devices and detects the signal strengths of the received second wireless signals. As a result, the determination apparatus can obtain two pieces of information, namely a reception strength of the first wireless signal at each of the communication devices and a reception strength of the second wireless signal, and can therefore make an accurate determination.

Additionally, because two pieces of information can be obtained for each of the communication devices, a configuration can be implemented in which, for example, the determination is made with respect to one of the front-rear direction and left-right direction of the vehicle body on the basis of the signal strengths of the second wireless signal, and the determination is made with respect to the other of the front-rear direction and left-right direction of the vehicle body on the basis of the signal strength of the first wireless signal. By employing a configuration in which the front-rear direction or the left-right direction is determined on the basis of one of the wireless signals in this manner, an antenna of the determination apparatus for transmitting the first wireless signal and an antenna of the determination apparatus for receiving the second wireless signal can be installed in positions suited to the respective determinations. The installation positions of the antennae can be determined by taking into consideration only one of the front-rear direction and the left-right direction, which relaxes limitations on where the apparatus can be installed in the vehicle.

In the present invention, for example, the determination apparatus makes the determination with respect to the left-right direction of the vehicle body on the basis of the signal strength of the first wireless signal received by the communication devices, and makes the determination with respect to the front-rear direction of the vehicle body on the basis of the signal strengths of the second wireless signals received by the determination apparatus itself from the communication devices. In this case, the antenna for transmitting the first wireless signal may be offset toward either the left or the right of the vehicle, and may be installed in any position with respect to the front-rear direction. Meanwhile, the antenna for receiving the second wireless signal may be offset toward either the front or the rear of the vehicle, and may be installed in any position with respect to the left-right direction.

Additionally, in the present invention, a plurality of the antennae may be provided. For example, two antennae for transmitting the first wireless signal may be provided, the two antennae being provided on the left side and the right side of the vehicle, respectively. The accuracy of the determination with respect to the left-right direction of the vehicle can be improved as a result. Additionally, in the case where the first wireless signal only reaches a short range, the range can be increased by increasing the number of antennae. This is useful, for example, in a situation where the first wireless signal is a signal in the LF (Low Frequency) band and the second wireless signal is a signal in the UHF (Ultra High Frequency) band. The configuration in which the LF band transmission antennae are provided on the left and right sides of the vehicle is the same as an antenna configuration used in a system that wirelessly controls the locking and unlocking of vehicle doors, and thus the antennae can be shared by the communication device mounting position determination system and a door lock system.

Advantageous Effects of Invention

According to the present invention, on the basis of the signal strength at which each communication device receives the first wireless signal transmitted from the determination apparatus and the signal strengths at which the determination apparatus receives the second wireless signal transmitted from the communication devices, the determination apparatus determines which of the wheels is provided with the communication device from which the determination apparatus has received the second wireless signal. Accordingly, limitations on where the transmission antenna and the receiving antenna can be installed in the vehicle can be relaxed, and accurate determinations can be made.

DETAILED DESCRIPTION OF PREFERRED EMBODIMENTS

Figure 1:
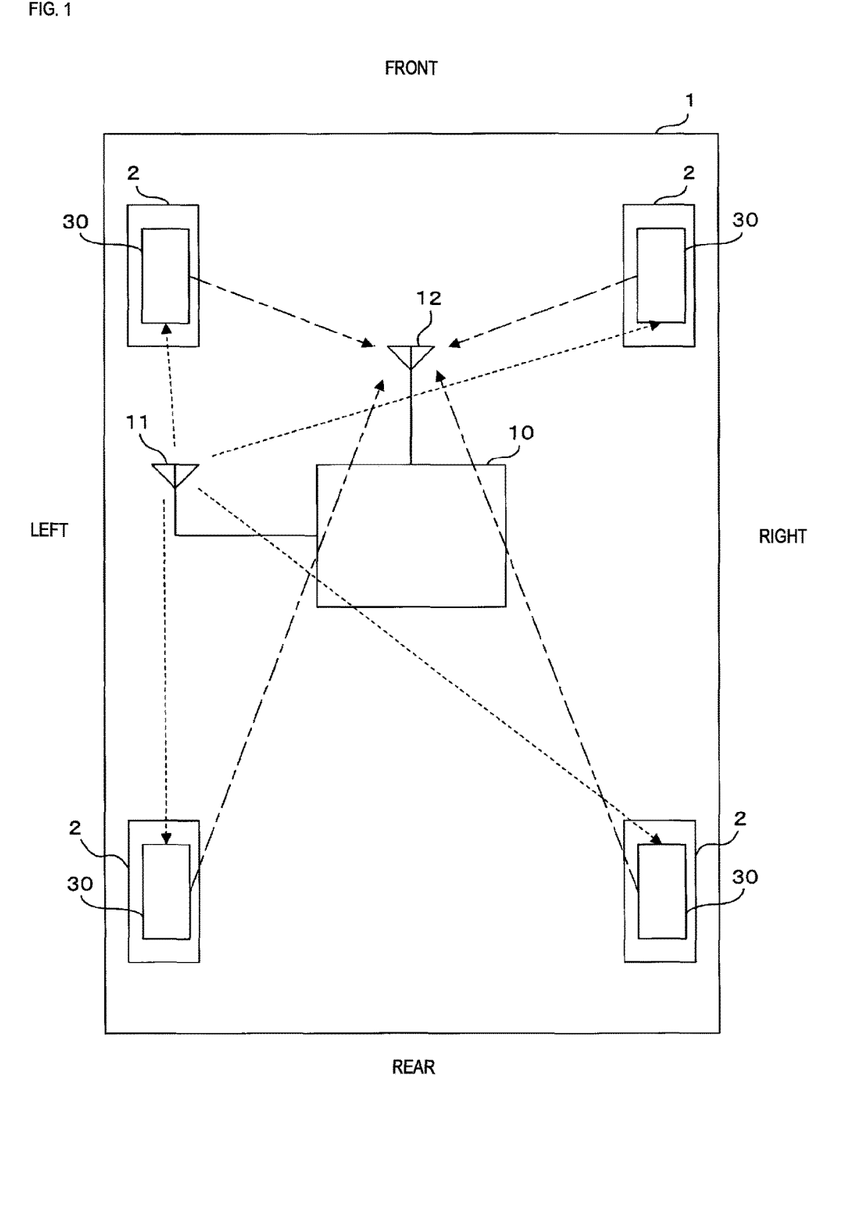
FIG. 1 is a block diagram illustrating the configuration of a communication device mounting position determination system according to the present invention.

The present invention will be described in detail hereinafter on the basis of drawings illustrating embodiments thereof. FIG. 1 is a block diagram illustrating the configuration of a communication device mounting position determination system according to the present invention. In the drawing, 1 indicates a vehicle. The vehicle 1 according to the present embodiment is a four-wheeled automobile having four wheels 2. In FIG. 1, "front", "rear", "left", and "right" indicate the directions of the vehicle 1. Here, the front side of the vehicle 1 corresponds to the travel direction of the vehicle 1.

The communication device mounting position determination system is configured including an ECU (Electronic Control Unit) 10 provided in the body of the vehicle 1, and a sensor unit 30 provided in each of the wheels 2. In the communication device mounting position determination system according to the present embodiment, the ECU 10 and the sensor units 30 transmit and receive wireless signals, and the system determines which wheel 2 is provided with the sensor unit 30 from which the ECU 10 has received the wireless signal. The communication device mounting position determination system can therefore determine in which position of the body of the vehicle 1 each wheel 2 is mounted, namely the left-front, the right-front, the left-rear, or the right-rear. The wheel determination may be provided as one function of a TPMS that detects the air pressure in tires on the wheels 2.

The ECU 10 and the sensor units 30 can exchange information through wireless communication. In the communication device mounting position determination system according to the present embodiment, the signals transmitted to the sensor units 30 from the ECU 10 are wireless signals in the LF band (called "LF signals" hereinafter), and the signals transmitted to the ECU 10 from the sensor units 30 are wireless signal in the UHF band (called "UHF signals" hereinafter). To that end, the ECU 10 includes an LF antenna 11 for transmitting the LF signal and a UHF antenna 12 for receiving the UHF signal. In the present embodiment, the LF antenna 11 is disposed in a position offset to the left from the center of the body of the vehicle 1. In other words, the LF antenna 11 is disposed in a position closer to the left-front and left-rear wheels 2 of the vehicle 1. Meanwhile, the UHF antenna 12 is disposed in a position offset to the front from the center of the body of the vehicle 1. In other words, the UHF antenna 12 is disposed in a position closer to the left-front and right-front wheels 2 of the vehicle 1. In the present embodiment, the ECU 10 including the LF antenna 11 and the UHF antenna 12 provided in the body of the vehicle 1 corresponds to a vehicle-side communication apparatus for which limitations on the position of installation in the vehicle 1 can be a problem.

The ECU 10 transmits LF signals requesting information to be transmitted, from the LF antenna 11 to the sensor units 30 (see the broken line arrows in the drawing). Having received this signal, each sensor unit 30 transmits information including identification information assigned to that sensor, an air pressure detection result for the tire of that wheel 2, and the signal strength of the received LF signal to the ECU 10 as the UHF signal. The ECU 10 receives the UHF signal from each sensor unit 30 through the UHF antenna 12. On the basis of the signal strength of each received UHF signals and the information included in the received UHF signals, the ECU 10 determines which wheel 2 is provided with the sensor unit 30 from which UHF signal has been received, and also checks the air pressure in the tire and so on.

Figure 2:
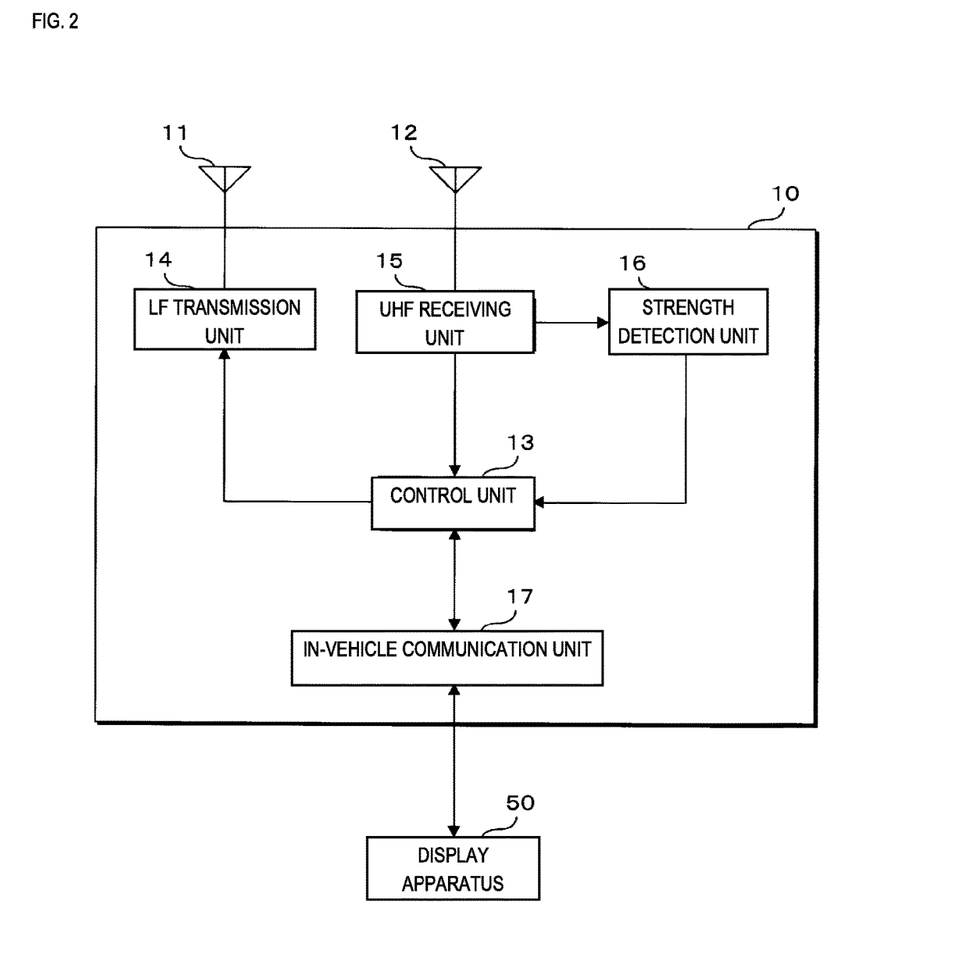
FIG. 2 is a block diagram illustrating the configuration of an ECU according to the present embodiment.

FIG. 2 is a block diagram illustrating the configuration of the ECU 10 according to the present embodiment. The ECU 10 according to the present embodiment is configured including a control unit 13, an LF transmission unit 14, a UHF receiving unit 15, a strength detection unit 16, an in-vehicle communication unit 17, and so on. The control unit 13 is configured using a CPU (Central Processing Unit), a microcomputer, or the like, and carries out various types of computational processes, control processes, and so on necessary for determining the positions of the wheels.

The LF transmission unit 14 is connected to the above-described LF antenna 11, and can wirelessly transmit the LF signal to the sensor units 30 through the LF antenna 11. Under the control of the control unit 13, the LF transmission unit 14 outputs, from the LF antenna 11, the LF signal requesting the sensor units 30 to transmit information. The UHF receiving unit 15 is connected to the above-described UHF antenna 12, and can receive the UHF signals transmitted by the sensor units 30 through the UHF antenna 12. The UHF receiving unit 15 supplies information obtained by demodulating the received UHF signals to the control unit 13. The strength detection unit 16 detects the signal strengths of the UHF signals received by the UHF receiving unit 15. The strength detection unit 16 communicates the detected signal strengths to the control unit 13. Note that the ECU 10 itself, the LF antenna 11, and the UHF antenna 12 may be disposed in separate locations in the vehicle 1, and may be connected as appropriate by signal lines or the like.

The in-vehicle communication unit 17 communicates with other vehicle-mounted devices over a CAN (Controller Area Network) or the like provided in the vehicle 1. In the present embodiment, the ECU 10 communicates with a display apparatus 50 through the in-vehicle communication unit 17, and displays results of detecting the air pressure in the tires and so on in the display apparatus 50. Note that the display apparatus 50 is a liquid crystal display or the like, and may be an apparatus used solely for this system, or may be shared with a car navigation apparatus or the like.

Figure 3:
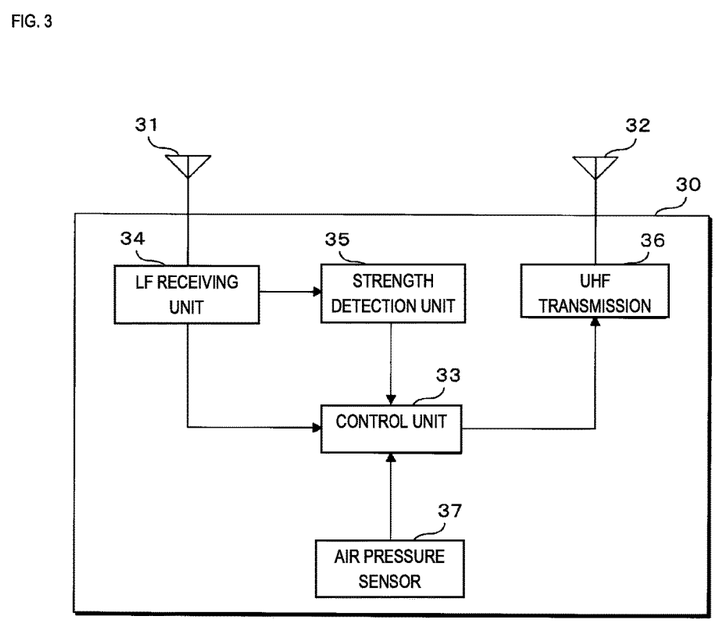
FIG. 3 is a block diagram illustrating the configuration of a sensor unit according to the present embodiment.

FIG. 3 is a block diagram illustrating the configuration of the sensor units 30 according to the present embodiment. Each of the sensor units 30 according to the present embodiment is configured including an LF antenna 31, a UHF antenna 32, a control unit 33, an LF receiving unit 34, a strength detection unit 35, a UHF transmission unit 36, an air pressure sensor 37, and the like. The control unit 33 controls the operations of the various units of the sensor unit 30, and carries out processing for transmitting information such as the air pressure of the tire, the signal strength of the LF signal, and so on in response to a request from the ECU 10.

The LF receiving unit 34 can receive the LF signal transmitted by the ECU 10 through the LF antenna 31. The LF receiving unit 34 supplies information obtained by demodulating the received LF signal to the control unit 33. The strength detection unit 35 detects the signal strength of the LF signal received by the LF receiving unit 34. The strength detection unit 35 communicates the detected signal strength to the control unit 33. The UHF transmission unit 36 can wirelessly transmit the UHF signal to the ECU 10 through the UHF antenna 32. The UHF transmission unit 36 transmits, from the UHF antenna 32, a UHF-band signal obtained by modulating information to be transmitted, supplied from the control unit 33. Note that the LF antenna 31 and the UHF antenna 32 may be provided as integrated parts of the sensor unit 30.

The air pressure sensor 37 is provided in an air valve or the like of the wheel 2, and is a sensor that outputs an electrical signal based on the air pressure in the tire. The control unit 33 obtains the air pressure of the tire by sampling the electrical signal outputted by the air pressure sensor 37.

In the position determination system according to the present embodiment, the ECU 10 monitors the tire air pressures of each of the wheels 2 on the basis of the information received wirelessly from the sensor units 30 provided in the wheels 2 of the vehicle 1, and issues a warning through the display apparatus 50 in the case where an abnormality has arisen in the air pressure. This is what is known as a TPMS function, and on the basis of the detection result from the air pressure sensor 37 included in the information received from the sensor unit 30, the ECU 10 issues the warning in the case where the tire air pressure of the wheel 2 is outside a permissible range.

Note that the vehicle 1 has four of the wheels 2, and the ECU 10 issues the warning such that a user can distinguish which of the wheels 2 has a tire air pressure outside of the permissible range. As such, it is necessary for the ECU 10 to carry out a process for determining which of the wheels 2 the information received from the four sensor units 30 pertains to, or in other words, a process for determining which of the wheels 2 is provided with the sensor unit 30 from which the information has been received. The ECU 10 according to the present embodiment makes this determination on the basis of the signal strengths of the UHF signals received from the sensor units 30, and the signal strengths at which the sensor units 30 received the LF signals, as included in the information transmitted in those UHF signals.

Although the wireless communication between the ECU 10 and the four sensor units 30 may be carried out simultaneously, this communication is carried out in order, one at a time, in the present embodiment. Individual identification information is assigned to each of the sensor units 30 in advance, and is stored in memory within the control unit 33, for example. The ECU 10 can select one of the four sensor units 30, and can specify a communication partner by including the identification information of the selected sensor unit 30 in the transmitted information. The sensor unit 30 responds wirelessly to the ECU 10 in the case where the identification information included in the information received from the ECU 10 matches the identification information stored by that sensor unit 30 itself. The ECU 10 can collect information pertaining to the four wheels 2 by communicating wirelessly with the sensor units 30 four times while changing the identification information.

In the case where it has become necessary to determine the tire air pressure, the control unit 13 of the ECU 10 supplies a command to the LF transmission unit 14 to transmit an LF signal for requesting the sensor units 30 to transmit information. At this time, the control unit 13 supplies the identification information of the sensor unit 30 to serve as the communication partner to the LF transmission unit 14. In response to the command from the control unit 13, the LF transmission unit 14 modulates information for transmission, including the specified identification information, and transmits that information from the LF antenna 11 as the LF signal.

The LF receiving unit 34 of the sensor unit 30 that has received the LF signal transmitted by the ECU 10 through the LF antenna 31 supplies information obtained by demodulating the received LF signal to the control unit 33. At this time, the strength detection unit 35 of the sensor unit 30 detects the signal strength of the LF signal received by the LF receiving unit 34, and notifies the control unit 33 of that signal strength. The control unit 33 determines whether or not the identification information included in the information received from the LF receiving unit 34 matches the identification information stored in that sensor unit 30 itself. In the case where the two pieces of identification information do not match, the control unit 33 does not respond to the ECU 10. However, in the case where the two pieces of identification information match, the control unit 33 generates information to be transmitted, including the tire air pressure detection result by the air pressure sensor 37 and the LF signal strength detection result by the strength detection unit 35, and supplies the generated information to the UHF transmission unit 36. The UHF transmission unit 36 demodulates the information supplied from the control unit 33 and transmits that information from the UHF antenna 32 as the UHF signal.

The UHF receiving unit 15 of the ECU 10 that has received the UHF signal transmitted by the sensor unit 30 through the UHF antenna 12 demodulates the received UHF signal and supplies the obtained information to the control unit 13. At this time, the strength detection unit 16 of the ECU 10 detects the signal strength of the UHF signal received by the UHF receiving unit 15, and notifies the control unit 13 of that signal strength. The control unit 13 obtains the result of detecting the tire air pressure of the wheel 2 from the information supplied from the UHF receiving unit 15, and determines whether or not the tire air pressure is within a predetermined range. In the case where the tire air pressure is outside of the predetermined range, the control unit 13 supplies an instruction to the in-vehicle communication unit 17, to display a warning message in the display apparatus 50.

Additionally, the control unit 13 of the ECU 10 carries out a process for determining which of the wheels 2 is provided with the sensor unit 30 serving as the communication partner, on the basis of the signal strength at which the LF signal was received, included in the information supplied from the UHF receiving unit 15, and the signal strength at which the UHF signal was received, as notified by the strength detection unit 16. As illustrated in FIG. 1, the LF antenna 11 according to the present embodiment is provided offset to the left of the body of the vehicle 1. As such, the signal strengths of the LF signals received by the sensor units 30 provided in the left-front and left-rear wheels 2 of the vehicle 1 will be greater than the signal strengths of the LF signals received by the sensor units 30 provided in the right-front and right-rear wheels 2 of the vehicle 1. Accordingly, the control unit 13 of the ECU 10 obtains the signal strength at which the LF signal was received by the sensor unit 30 from the information supplied by the UHF receiving unit 15, and on the basis of whether or not the obtained signal strength exceeds a threshold, determines whether the sensor unit 30 serving as the communication partner is provided in one of the wheels 2 on the left side of the vehicle 1 or one of the wheels 2 on the right side of the vehicle 1.

Additionally, the UHF antenna 12 according to the present embodiment is provided so as to be offset to the front of the body of the vehicle 1, as illustrated in FIG. 1. Accordingly, the signal strengths at which the UHF signals transmitted from the sensor units 30 provided in the left-front and right-front wheels 2 of the vehicle 1 are received by the UHF antenna 12 will be greater than the signal strengths at which the UHF signals transmitted from the sensor units 30 provided in the left-rear and right-rear wheels 2 of the vehicle 1 are received by the UHF antenna 12. Accordingly, on the basis of whether or not the signal strength at which the UHF signal is received, detected by the strength detection unit 16, exceeds a threshold, the control unit 13 of the ECU 10 determines whether the sensor unit 30 serving as the communication partner is provided in one of the wheels 2 on the front side of the vehicle 1 or in one of the wheels 2 on the rear side of the vehicle 1.

By combining the left-right determination result based on the signal strengths of the LF signals with the front-rear determination result based on the signal strengths of the UHF signals, the control unit 13 determines in which of the left-front, the left-rear, the right-front, and the right-rear wheels 2 of the vehicle 1 the sensor unit 30 serving as the communication partner is provided. In the case where a warning pertaining to the tire air pressure is issued as described above, the control unit 13 displays, in the display apparatus 50, the mounting position of the wheel 2 for which the warning is issued.

Figure 4:
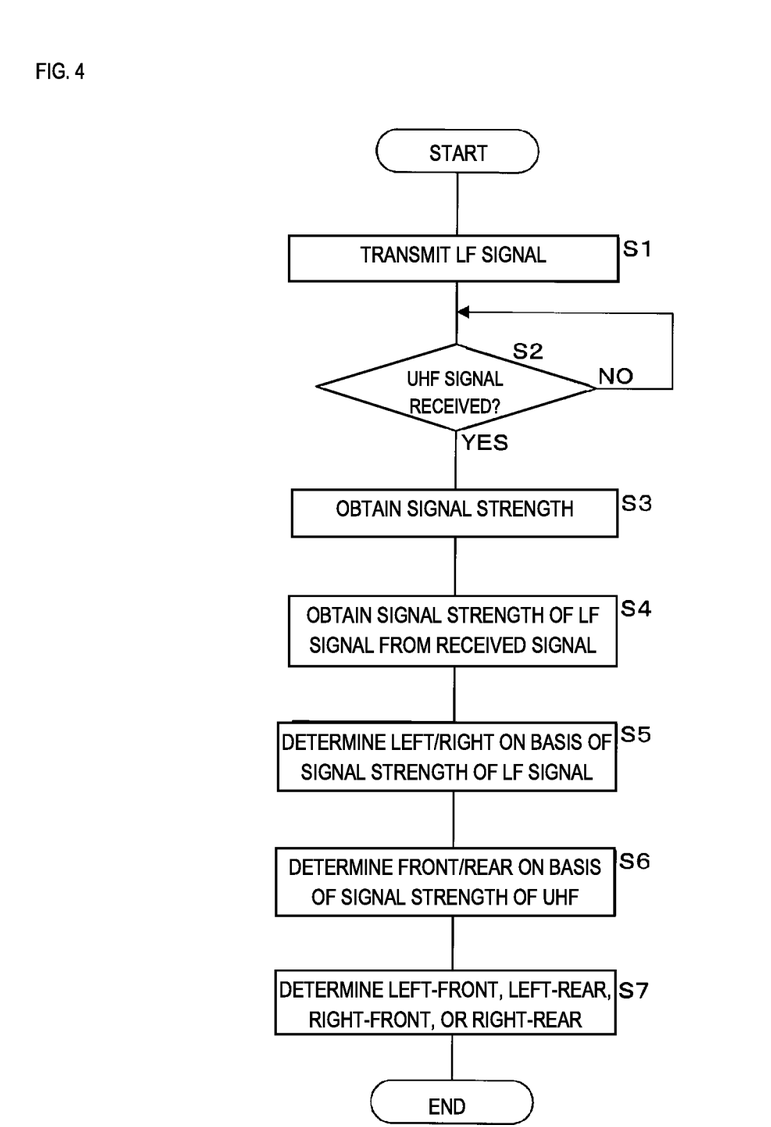
FIG. 4 is a flowchart illustrating the sequence of a determination process carried out by the ECU according to the present embodiment.

FIG. 4 is a flowchart illustrating the sequence of the determination process carried out by the ECU 10 according to the present embodiment. Note that this flowchart illustrates only the process of determining which of the wheels 2 is provided within the sensor unit 30 from which a signal has been received, and does not illustrate the processes of determining the tire air pressure, issuing the warning, and so on. First, the control unit 13 of the ECU 10 transmits the LF signal to the sensor unit 30 by supplying a command to the LF transmission unit 14 (step S1). The LF signal transmitted at this time includes the identification information of the sensor unit 30 specified as the communication partner and the like. The sensor unit 30 responds to the transmission of this LF signal with a UHF signal, and thus the control unit 13 determines whether or not a UHF signal has been received from the sensor unit 30 by the UHF receiving unit 15 (step S2). In the case where the UHF signal has not been received (S2: NO), the control unit 13 stands by until the UHF signal is received.

In the case where the UHF signal has been received (S2: YES), the control unit 13 obtains the signal strength of the UHF signal notified as the detection result from the strength detection unit 16 (step S3). The control unit 13 also obtains the information of the signal strength of the LF signal included in the received information supplied from the UHF receiving unit 15 (step S4). On the basis of the signal strength of the LF signal obtained in step S4, the control unit 13 determines whether the sensor unit 30 serving as the communication partner is provided in one of the wheels 2 on the left side or the right side of the body of the vehicle 1 (step S5). Additionally, on the basis of the signal strength of the UHF signal obtained in step S3, the control unit 13 determines whether the sensor unit 30 serving as the communication partner is provided in one of the wheels 2 on the front side or the rear side of the body of the vehicle 1 (step S6). Then, by combining the results of the determinations made in steps S5 and S6, the control unit 13 determines which of the wheels 2 is provided with the sensor unit 30 from which the UHF signal has been received, or in other words, in which of the left-front, left-rear, right-front, and right-rear wheels 2 of the vehicle 1 the sensor unit 30 serving as the communication partner is provided (step S7), after which the process ends.

Note that the control unit 13 makes the determination for all of the wheels 2 in the vehicle 1 by repeating the processing illustrated in FIG. 4. In other words, in the present embodiment, the control unit 13 makes the determination for the four wheels 2 by carrying out the processing illustrated in FIG. 4 four times.

Figure 5:
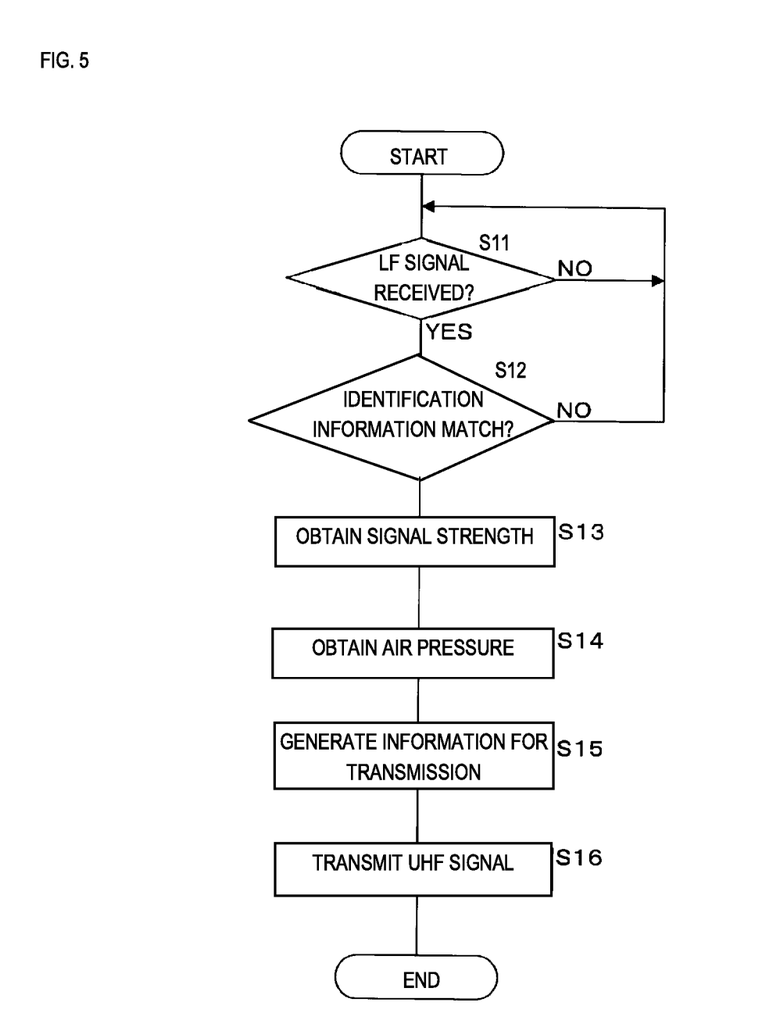
FIG. 5 is a flowchart illustrating the sequence of a process carried out by the sensor unit according to the present embodiment.

FIG. 5 is a flowchart illustrating the sequence of a process carried out by the sensor unit 30 according to the present embodiment. The control unit 33 of the sensor unit 30 determines whether or not the LF receiving unit 34 has received the LF signal from the ECU 10 (step S11). In the case where the LF signal has not been received (S11: NO), the control unit 33 stands by until the LF signal from the ECU 10 is received. In the case where the LF signal has been received (S11: YES), the control unit 33 obtains the identification information from the received information supplied from the LF receiving unit 34, and determines whether or not that identification information matches the identification information stored by the sensor unit 30 itself (step S12). In the case where the two pieces of identification information do not match (S12: NO), the control unit 33 returns the processing to step S11.

In the case where the two pieces of identification information match (S12: YES), the control unit 33 obtains the signal strength of the LF signal notified as the detection result from the strength detection unit 35 (step S13). The control unit 33 also obtains the tire air pressure detected by the air pressure sensor 37 (step S14). The control unit 33 generates information to be transmitted, including information of the signal strength obtained in step S13 and the air pressure obtained in step S14 (step S15). The control unit 33 then supplies, to the UHF transmission unit 36, the generated information to be transmitted, and that information is then transmitted to the ECU 10 as the UHF signal (step S16), after which the process ends.

In the position determination system according to the present embodiment configured as described thus far, the sensor units 30 provided in the wheels 2 of the vehicle 1 and the ECU 10 provided in the vehicle body exchange wireless signals, and the system determines which of the wheels is provided with the sensor unit 30 from which the wireless signal is received by the ECU 10. The ECU 10 transmits a wireless signal in the LF band (that is, the LF signal) to the sensor units 30 from the LF antenna 11, using the LF transmission unit 14. Each of the sensor units 30 receives the LF signal from the ECU 10 using the LF receiving unit 34, and detects the signal strength of the received LF signal using the strength detection unit 35. The sensor unit 30 transmits to the ECU 10, as a wireless signal in the UHF band (that is, the UHF signal), information including the detected signal strength of the LF signal. The ECU 10 receives the UHF signals from the sensor units 30 using the UHF receiving unit 15, and detects the signal strengths of the UHF signals using the strength detection unit 16. As a result, the ECU 10 can obtain two pieces of information, namely the signal strength of the LF signal and the signal strength of the UHF signal, for each of the sensor units 30, and can make the determination on the basis of these two pieces of information, enabling a highly-accurate determination to be made.

The ECU 10 makes a determination pertaining to the left-right direction of the body of the vehicle 1 on the basis of the signal strength of the LF signal received by the sensor units 30, and makes a determination pertaining to the front-rear direction of the vehicle body on the basis of the signal strengths of the UHF signals the ECU 10 itself has received from the sensor units 30. The LF antenna 11 for transmitting the LF signal may be offset toward either the left or the right of the vehicle 1, and may be installed in any position with respect to the front-rear direction. Meanwhile, the UHF antenna 12 for receiving the UHF signal may be offset toward either the front or the rear of the vehicle 1, and may be installed in any position with respect to the left-right direction.

In the present embodiment, the configuration is such that the LF signal is transmitted from the ECU 10 to the sensor units 30, and the UHF signals are transmitted from the sensor units 30 to the ECU 10. However, the configuration is not limited thereto. For example, the configuration may be such that the UHF signal is transmitted from the ECU 10 to the sensor units 30, and the LF signals are transmitted from the sensor units 30 to the ECU 10. Furthermore, although the configuration is such that the left-right determination is made on the basis of the signal strength of the LF signal and the front-rear determination is made on the basis of the signal strengths of the UHF signal, the configuration is not limited thereto. The configuration may be such that the front-rear determination is made on the basis of the signal strength of the LF signal and the right-left determination is made on the basis of the signal strengths of the UHF signals. In this case, the arrangement of the LF antenna 11 and the UHF antenna 12 may be reversed. Furthermore, the signals transmitted by the ECU 10 and the sensor units 30 are not limited to LF signals and UHF signals, and wireless signals in other frequency bands may be employed instead.

The flowchart illustrated in FIG. 4 indicates a sequence in which the front-rear determination is made on the basis of the signal strengths of the UHF signal after the left-right determination is made on the basis of the signal strengths of the LF signal. However, the front-rear and left-right determinations may be made in the reverse order, or simultaneously. In other words, the processes of steps S5 and S6 may be carried out in either order, or simultaneously. Furthermore, although the configuration is such that the ECU 10 has one each of the LF antenna 11 and the UHF antenna 12, the configuration is not limited thereto, and may be such that the ECU 10 includes a plurality of LF antennae 11 and/or UHF antennae 12.

(Variation)

Figure 6:
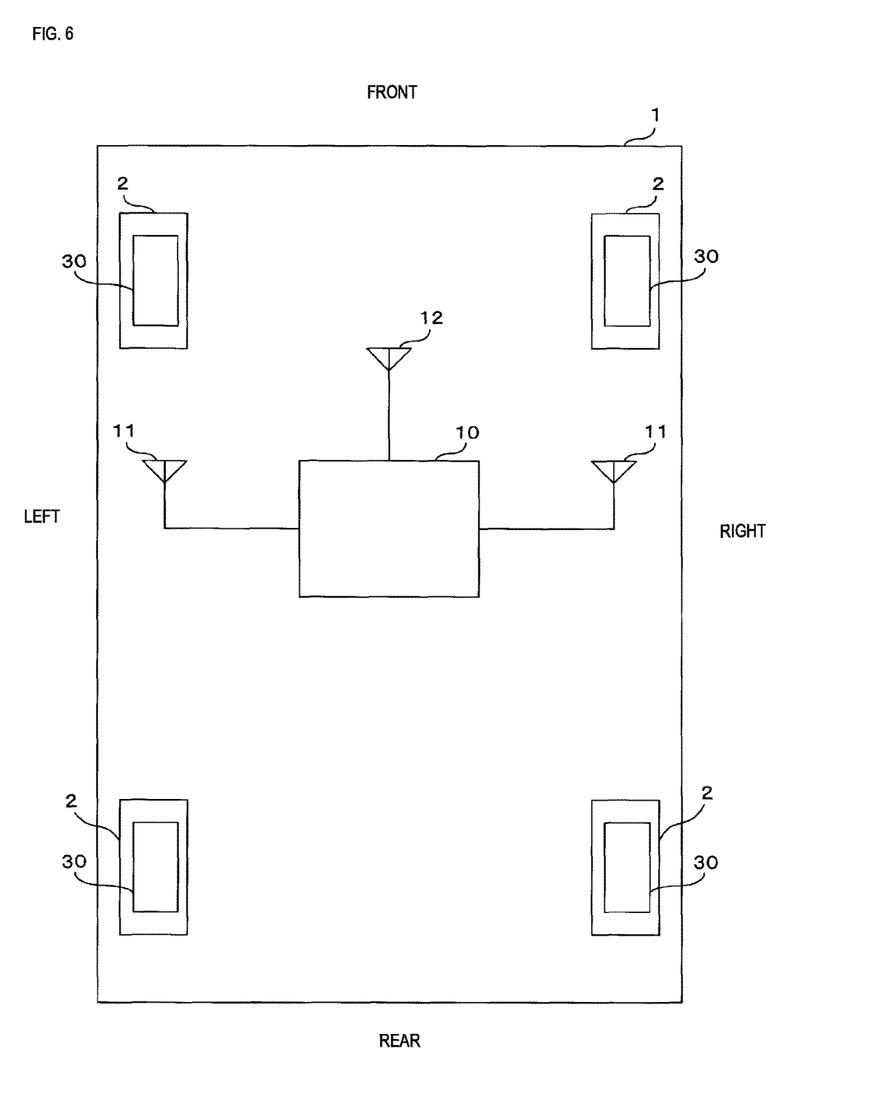
FIG. 6 is a block diagram illustrating the configuration of a communication device mounting position determination system according to a variation.

FIG. 6 is a block diagram illustrating the configuration of a communication device mounting position determination system according to a variation. The position determination system according to the variation is configured such that the ECU 10 includes two LF antennae 11 for transmitting the LF signal. The first LF antenna 11 is provided in the left side of the body of the vehicle 1, and the second LF antenna 11 is provided in the right side of the vehicle body. Although not illustrated, the ECU 10 may be configured to include two LF transmission units 14, corresponding to the left and right LF antennae 11, or may be configured such that a single LF transmission unit 14 switches between the two LF antennae 11.

In the case where the vehicle is equipped with a door lock system in which a user locks and unlocks the doors through communication with a wireless device s/he carries, antennae for carrying out wireless communication with the wireless device using LF-band wireless signals are provided in left and right parts of the vehicle. The two LF antennae 11 of the communication device mounting position determination system according to the variation can be shared with such a door lock system.

For example, the ECU 10 communicates wirelessly with the four sensor units 30 in order using the left-side LF antenna 11, and then communicates wirelessly with the four sensor units 30 in order using the right-side LF antenna 11. As a result, the ECU 10 can obtain three pieces of information for each of the sensor units 30, namely the signal strength at which the LF signal transmitted from the left-side LF antenna 11 is received, the signal strength at which the LF signal transmitted from the right-side LF antenna 11 is received, and the signal strength of the UHF signal received through the UHF antenna 12. The ECU 10 makes the determination pertaining to the left-right direction of the vehicle 1 on the basis of the signal strengths of the two LF signals, and makes the determination pertaining to the front-rear direction on the basis of the signal strengths of the UHF signals.

The position determination system according to the variation includes a plurality of the LF antennae 11 that transmit the LF signals from the ECU 10 to the sensor units 30, and can therefore make more accurate determinations. The communication device mounting position determination system according to the variation is useful in cases where the LF signals transmitted from the LF antennae 11 only have a short range. For example, a situation may arise in which the LF signal transmitted from the left-side LF antenna 11 has a short range, and thus the LF signal reaches the sensor units 30 provided in the left-front, left-rear, and right-front wheels 2 of the vehicle 1 but does not reach the sensor unit 30 provided in the right-rear wheel 2. In this situation, it is highly likely that the LF signal transmitted from the right-side LF antenna 11 also has a short range, and thus the LF signal reaches the sensor units 30 provided in the left-front, right-front, and right-rear wheels 2 of the vehicle 1 but does not reach the sensor unit 30 provided in the left-rear wheel 2. In such a situation, providing the two LF antennae 11 in left and right parts of the vehicle 1 make it possible to communicate wirelessly with all of the sensor units 30.

Although the communication device mounting position determination system according to the variation is configured so as to share the LF antennae 11 with a door lock system, the configuration is not limited thereto. The position determination system may be configured including dedicated LF antennae 11 that are not shared with the door lock system. Additionally, although the position determination system according to the variation is configured including two LF antennae, the configuration is not limited thereto, and may be such that three or more of the LF antenna 11 are included. The position determination system may also be configured to include two or more of the UHF antennae 12.

The invention claimed is:

1. A communication device mounting position determination system comprising a communication device provided in each of wheels of a vehicle and a determination apparatus, provided in a vehicle body of the vehicle, including a determination unit that exchanges wireless signals with the communication devices and determines which of the vehicle wheels is provided with the communication device from which the wireless signal has been received,
wherein the determination apparatus includes:
a vehicle body-side transmission unit that transmits a first wireless signal in a first frequency band to the communication devices;
a vehicle body-side receiving unit that receives a second wireless signal in a second frequency band transmitted by the communication devices; and
a vehicle body-side signal strength detection unit that detects a signal strength of the second wireless signal received by the receiving unit,
wherein each of the communication devices includes:
a wheel-side receiving unit that receives the first wireless signal transmitted by the determination apparatus;
a wheel-side signal strength detection unit that detects a signal strength of the first wireless signal received by the receiving unit; and
a wheel-side transmission unit that transmits, in the second wireless signal, information including the signal strength detected by the signal strength detection unit, and
wherein the determination unit determines which wheel is provided with the communication device from which the vehicle body-side receiving unit has received the second wireless signal on the basis of the signal strength of the second wireless signal detected by the vehicle body-side signal strength detection unit and the signal strength included in the second wireless signal received by the vehicle body-side receiving unit.

2. The communication device mounting position determination system according to claim 1,
wherein the vehicle is provided with four of the wheels, the wheels being provided on the front- and rear- left and right of the vehicle body; and
the determination unit:
determines a direction in which the communication device that is the transmission source of the second wireless signal received by the vehicle body-side receiving unit is provided with respect to one of a front-rear direction of the vehicle body and a left-right direction of the vehicle body, on the basis of the signal strength of the first wireless signal included in the second wireless signal received by the vehicle body-side receiving unit; and
determines a direction in which the communication device that is the transmission source of the second wireless signal received by the vehicle body-side receiving unit is provided with respect to the other of the front-rear direction of the vehicle body and the left-right direction of the vehicle body, on the basis of the signal strength of the second wireless signal detected by the vehicle body-side signal strength detection unit.

3. The communication device mounting position determination system according to claim 2,
wherein the determination unit:
determines the direction in which the communication device that is the transmission source of the second wireless signal received by the vehicle body-side receiving unit is provided with respect to the left-right direction of the vehicle body, on the basis of the signal strength of the first wireless signal included in the second wireless signal received by the vehicle body-side receiving unit; and
determines the direction in which the communication device that is the transmission source of the second wireless signal received by the vehicle body-side receiving unit is provided with respect to the front-rear direction of the vehicle body, on the basis of the signal strength of the second wireless signal detected by the vehicle body-side signal strength detection unit.

4. The communication device mounting position determination system according to claim 3,
wherein an antenna through which the vehicle body-side transmission unit transmits the first wireless signal is offset toward the left side or the right side of the vehicle; and
an antenna through which the vehicle body-side receiving unit receives the second wireless signal is offset toward the front side or the rear side of the vehicle.

5. The communication device mounting position determination system according to claim 4,
wherein two antennae through which the vehicle body-side transmission unit transmits the first wireless signal are provided, the antennae being provided on the left side and the right side of the vehicle, respectively.

6. The communication device mounting position determination system according to claim 1,
wherein the first frequency band is an LF (Low Frequency) band; and
the second frequency band is a UHF (Ultra High Frequency) band.

7. A determination apparatus, provided in a vehicle body of a vehicle, including a determination unit that exchanges wireless signals with a communication device provided in each of wheels of the vehicle and determines which of the vehicle wheels is provided with the communication device from which the wireless signal has been received, the apparatus comprising:
a vehicle body-side transmission unit that transmits a first wireless signal in a first frequency band to the communication devices;
a vehicle body-side receiving unit that receives a second wireless signal in a second frequency band transmitted by the communication devices; and
a vehicle body-side signal strength detection unit that detects a signal strength of the second wireless signal received by the receiving unit,
wherein each of the communication devices detects a signal strength of the received first wireless signal and transmits, in the second wireless signal, information including the detected signal strength; and the determination unit determines which wheel is provided with the communication device from which the vehicle body-side receiving unit has received the second wireless signal on the basis of the signal strength of the second wireless signal detected by the vehicle body-side signal strength detection unit and the signal strength included in the second wireless signal received by the vehicle body-side receiving unit.

8. The communication device mounting position determination system according to claim 2, wherein the first frequency band is an LF (Low Frequency) band; and the second frequency band is a UHF (Ultra High Frequency) band.

9. The communication device mounting position determination system according to claim 3, wherein the first frequency band is an LF (Low Frequency) band; and the second frequency band is a UHF (Ultra High Frequency) band.

10. The communication device mounting position determination system according to claim 4, wherein the first frequency band is an LF (Low Frequency) band; and the second frequency band is a UHF (Ultra High Frequency) band.

11. The communication device mounting position determination system according to claim 5, wherein the first frequency band is an LF (Low Frequency) band; and the second frequency band is a UHF (Ultra High Frequency) band.

* * * * *